Dec. 23, 1952 E. H. KAHN ET AL 2,622,882

DISK TYPE PHONOGRAPH APPARATUS

Filed Oct. 13, 1948

INVENTORS.
ELLIOTT H. KAHN
MELVIN I. BUDKA
HAROLD U. FRIEDMAN

BY Joseph B. Forman
ATTORNEY.

Patented Dec. 23, 1952 2,622,882

UNITED STATES PATENT OFFICE 2,622,882

DISK TYPE PHONOGRAPH APPARATUS

Elliott H. Kahn, Melvin I. Budka, and Harold U. Friedman, Brooklyn, N. Y.

Application October 13, 1948, Serial No. 54,226

2 Claims. (Cl. 274—9)

The present invention relates to phonograph apparatus of the type employing disc records, and has as its principal object the adaptation of an existing phonograph having a relatively high turntable speed and high needle pressure, corresponding to certain record playing standards, to a lower turntable speed and more delicate needle pressure, corresponding to other record playing standards. It is a further object of the invention to achieve this adaptation without disabling the phonograph from use in its original form involving the relatively higher velocity and needle pressure.

A still further object is to provide speed-reduction transmission having a continuously adjustable ratio, such as may be utilized to convert between different speeds not necessarily related by any simple ratio. An additional object is to provide an arrangement for insuring tracking of a pivoted pickup of very light pressure, such as is required in playing records of the low-speed light pressure class.

The recent introduction of 33 R. P. M. records, requiring ⅕ ounce needle pressure, has threatened the widely used 78 R. P. M. phonographs of 0.5 to 1.0 ounce pressure with obsolescence. The older record standards are however not to be entirely disregarded or forgotten because many records based on the old standard are in the hands of users and are presently being produced in large quantities. To meet both these standards, there has appeared in commerce a two-speed two-pressure record player employing a two-speed motor or drive for the turntable, and two separate tone arms each counterbalanced for proper needle pressure required by associated separate pickups mounted thereto. Should one desire to adopt such a record player, it becomes necessary to discard the existing turntable, driving mechanism, record changing mechanism (where applicable) and pickup, and embark on a new investment in the purchase of the new mechanism.

The present invention is unique in that it fully preserves the usefulness of the earlier equipment by adding a speed-reduction turntable that operates in association with the old turntable, and a device for reducing the pickup pressure without, however, introducing difficulties connected with continuous tracking of the needle in the groove. The invention will adapt existing phonographs to the new standards; yet simple removal of the invented equipment fully restores the record player to its original capabilities. A presently preferred embodiment of the invention is shown in the accompanying drawings, and described in detail below; and we feel that from these the several features of the invention, which are pointed out in the appended claims will be better understood and appreciated.

Figures 1, 2, 3:
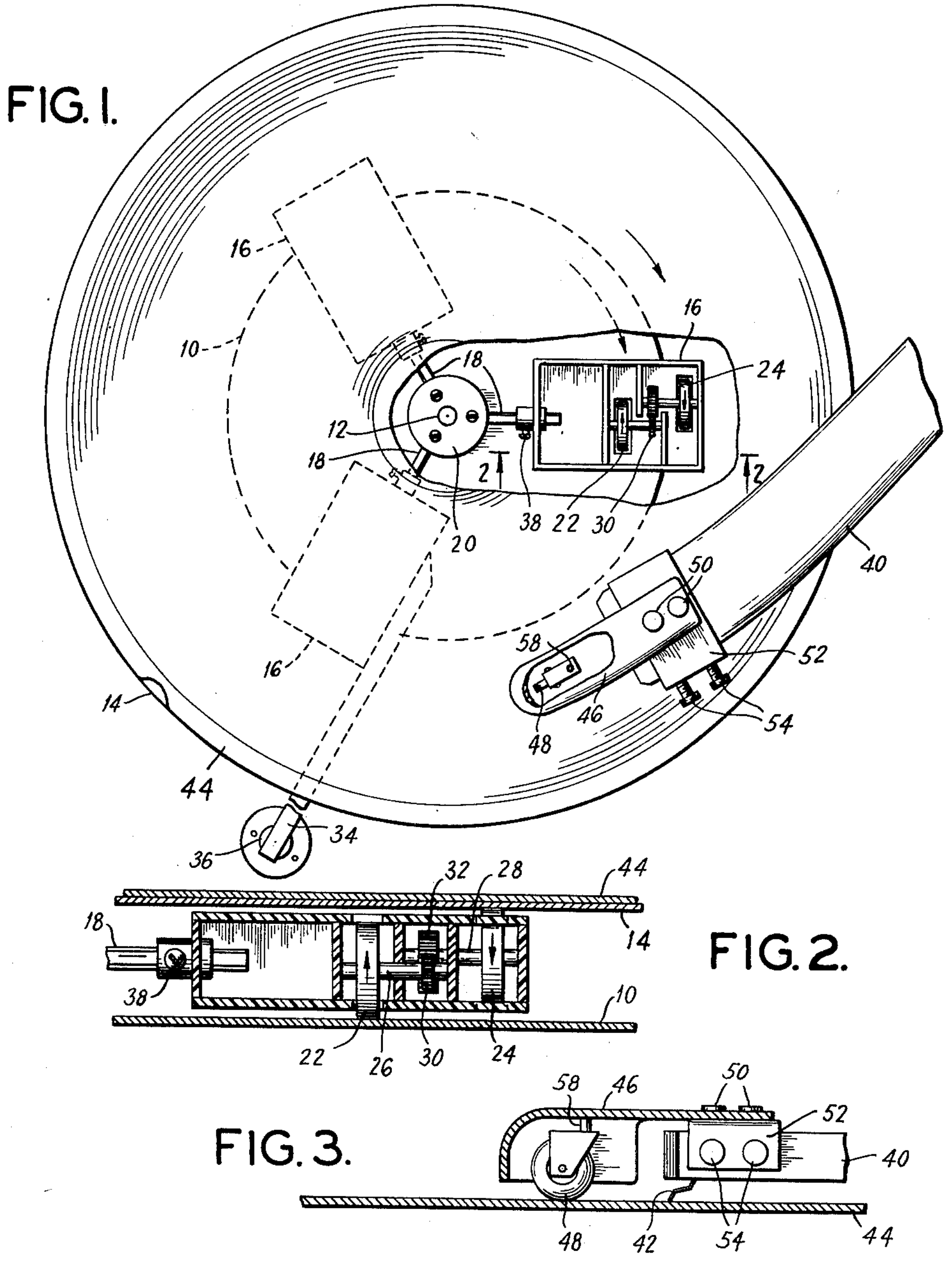
Figure 1 is a plan view of the conversion apparatus as applied to an existing phonograph, parts being broken away for purposes of clarity.
Figure 2 is an enlarged lateral section taken along the line 2—2 of Figure 1.
Figure 3 is a lateral view, partly in section, of the pickup attachment of Figure 1.

In Figure 1, the turntable 10 of the existing phonograph is shown, having spindle 12 projecting sufficiently upward, in the majority of instances, to retain ten or more centrally apertured records. Above the turntable 10, and centered on spindle 12, is a second turntable 14, which is added as an attachment, and is to be driven at lower speeds. Three anti-friction units 16, support the upper turntable 14 on the lower turntable 10; and at least one of the units incorporates a speed reduction transmission arrangement. Units 16 are rigidly spaced respective one another by means of rods 18 extending radially from ring 20 which is freely mounted with respect to spindle 12, permitting the spindle to turn if necessary.

Each unit 16 contains a pair of wheels or rollers 22 and 24, each having its own shaft and arranged to engage a respective one of the two turntables 10 and 14 frictionally.

Secured to shafts 26 and 28, in at least one of said units 16, there is a pair of speed-reducing gears 30, 32. The spur gears shown, 30, 32, provide assurance that rollers 22 and 24 rotate in opposite directions; but in view of the fact that roller 22 bears down on turntable 10, and is driven thereby while roller 24 is in driving engagement with turntable 14, the two turntables are constrained to move in the same direction at relative speeds. A shaft 34 extends radially from one unit 16 into a fixed slotted post 36, which prevents the units 16 from riding on and rotating with turntable 10.

Gears 30 and 32 have a step-down ratio that is something less than the desired speed-reduction ratio to compensate for the radial separation of rollers 22 and 24. A further point, of great significance, is the radial adjustability of units 16 along rods 18, permitting compensation for rotation of the turntable 10 at speeds other than its rated speed, so that turntable 14 may rotate at the desired speed. The further unit 16 is moved from the center ring 20, the closer to unity the ratio. Adjustment of units 16 is retained by means of screws 38.

The radial separation of rollers 22 and 24 makes possible the adjustments of speed-reductions to any arbitrary ratio (within limits); and the radial adjustment ability of units 16 has the remarkable property of varying the transmission ratio inasmuch as the radial separation of the rollers, though they may be of equal diameters, modifies the transmission ratio of the spur gears alone.

Turntable 14, and the assembly of units 16 are readily removable when it is desired to restore the original playing speed; and when so removed, without need for tools, the original appearance as well as operating characteristics of turntable 10 are fully restored.

A corollary to playing speed reduction is needle pressure reduction if the conversion is to be useful in meeting the new phonograph record standards. Aside from reducing the pressure, it is oft times necessary to provide another needle; however pickups are available which will play both classes of records satisfactorily if pressure requirements are fulfilled. In order to reduce the pressure of the conventional tone arm 40 on the needle which bears on record 44, a light leaf spring 46 associated with a caster 48 is affixed to arm 40, reducing the weight carried by the needle in view of the transmission of a portion of the weight of tone arm 40 through leaf spring 46 and caster 48 to record 44. The extent of the pressure compensation afforded by spring 46 and caster 48 may be varied by means of mounting channel member 52, which is shown secured to the tone arm 40 by knurl headed screws 54, to which leaf spring 46 is fastened by means of rivet 50. Movement of mounting channel member 52 along the length of tone arm 40 results in varied needle pressure depending on the point at which the channel member is affixed to the tone arm. It is noteworthy that caster 48 is formed with the pivot point 58 rearward of the point of contact with the record, promoting reliable tracking even though the tone arm needle pressure is light and an occasional force is encountered that tends to shift the needle laterally out of its groove.

The several aspects of the foregoing invention are manifestly subject to modification and rearrangement. It is therefore our intention that the appended claims be interpreted in light of the spirit and scope of the invention.

What is claimed is:

1. An adaptor for converting the speed of a record player, comprising a central body member, an aperture extending through said central body member, said aperture being adapted to fit about the spindle of a phonograph turntable, means extending from said central body member for fastening said body member against movement respective a turntable, a plurality of spaced apart supporting members extending radially from said central body member, each of said supporting members including a first roller and a second roller, said first roller depending from said supporting member in one plane, and being adapted to engage a turntable below said central body member, said second roller depending from said supporting member in another plane, and being adapted to engage a second turntable in a plane parallel to said first turntable, and gearing means between said first and second rollers, said gearing means having a ratio different than unity.

2. An adaptor for converting the speed of a record player, comprising a central body member, an aperture extending through said central body member, said aperture being adapted to fit about the spindle of a phonograph turntable, means extending from said central body member for fastening said body member against movement respective a turntable, a plurality of spaced apart supporting members extending radially from said central body member, each of said supporting members including a first roller and a second roller, said first roller depending from said supporting member in one plane, and being adapted to engage a turntable below said central body member, said second roller depending from said supporting member in another plane and being adapted to engage a second turntable in a plane parallel to said first turntable, and gearing means between said first and second rollers in one of said supporting members, said gearing means having a ratio different than unity.

ELLIOTT H. KAHN.
MELVIN I. BUDKA.
HAROLD U. FRIEDMAN.

REFERENCES CITED

The following references are of record in the file of this patent:

UNITED STATES PATENTS

| Number | Name | Date |
|---|---|---|
| 1,547,768 | Little | July 28, 1925 |
| 1,852,456 | Fritz | Apr. 5, 1932 |
| 1,883,565 | Christiansen | Oct. 18, 1932 |
| 2,034,105 | Loughridge | Mar. 17, 1936 |
| 2,328,862 | Thompsen | Sept. 7, 1943 |
| 2,353,370 | Sears | July 11, 1944 |

FOREIGN PATENTS

| Number | Country | Date |
|---|---|---|
| 351,408 | Great Britain | June 17, 1930 |
| 340,905 | Great Britain | Jan. 8, 1931 |